(12) United States Patent
Harper et al.

(10) Patent No.: US 8,267,313 B2
(45) Date of Patent: Sep. 18, 2012

(54) SYSTEM AND METHOD FOR PROVIDING A GIFT CARD WHICH AFFORDS BENEFITS BEYOND WHAT IS PURCHASED

(75) Inventors: Taryn C. Harper, New York, NY (US); Miriam Alejandro, Frisco, TX (US); Patricia W. Stickley, Goshen, NY (US); Lisa Gordon, Leesburg, VA (US); Scott Scovel, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 1541 days.

(21) Appl. No.: 11/555,060

(22) Filed: Oct. 31, 2006

(65) Prior Publication Data

US 2008/0099551 A1 May 1, 2008

(51) Int. Cl.
*G06K 5/00* (2006.01)
(52) U.S. Cl. .......................................... 235/380; 705/35
(58) Field of Classification Search .................. 235/380; 705/35
See application file for complete search history.

(56) References Cited

U.S. PATENT DOCUMENTS

| | | | |
|---|---|---|---|
| 2004/0186773 A1* | 9/2004 | George et al. | 705/14 |
| 2006/0105837 A1* | 5/2006 | Walker et al. | 463/25 |
| 2006/0208065 A1* | 9/2006 | Mendelovich et al. | 235/380 |

* cited by examiner

*Primary Examiner* — Daniel Hess
*Assistant Examiner* — Rafferty Kelly
(74) *Attorney, Agent, or Firm* — Snell & Wilmer L.L.P.

(57) ABSTRACT

A system, computer product and method are provided for a card issuer providing a prepaid gift card to a purchaser, the gift card usable by a recipient of the card to pay merchants who participate in a financial network. The method includes receiving a payment of a predetermined amount, and loading the predetermined amount received from the purchaser into the prepaid gift card. The method further includes activating the loaded prepaid gift card, the activated prepaid gift card being usable by the recipient for paying any of the merchants in the financial network until the predetermined amount loaded in the prepaid gift card is exhausted, and being usable by the recipient to obtain a benefit beyond what is purchased from at least some of the merchants in the financial network.

17 Claims, 10 Drawing Sheets

SYSTEM AND METHOD FOR PROVIDING A GIFT CARD WHICH AFFORDS BENEFITS BEYOND WHAT IS PURCHASED

BACKGROUND OF THE INVENTION

1. Field of the Invention

The present invention generally relates to stored value cards, and more particularly to stored value cards such as prepaid or gift cards which provide a user or recipient of the card with benefits, from at least some of the merchants in the relevant financial network, beyond what is purchased with the card.

2. Related Art

Smart cards, which are portable transaction cards providing cash equivalent value for use within an existing transaction infrastructure, are becoming more and more prevalent in the U.S. and throughout the world. Such cards are typically the size of conventional plastic credit cards, and include an embedded computer chip having processing power and memory to enable the card to be associated with a transaction account for use by a consumer. Smart card-enhanced systems are in wide use in several fields, including healthcare, banking, and transportation.

One typical smart card application is a "stored value card," which is a pre-paid card that acts like an electronic purse, such as a gift card. In stored value cards, a prepaid amount of currency value is stored in the smart card memory for use as conventional cash, enabling the card to be used. For example, once a customer deposits fifty dollars of value into the account associated with the stored value card, the card may be used, upon activation, for payments of up to fifty dollars.

In operation, a user inserts the card into a terminal device which communicates with the card through contacts. The terminal device may be part of a cash register, a vending machine, or another type of point-of-sale device. Upon being inserted, the value amount of the purchase is transferred from the card to the merchant terminal or to a central clearing and authorization system such that the merchant may be credited with the requisite amount of value. Consequently, the value amount of the consumer's card is reduced correspondingly.

Stored value cards can be desirable for a number of reasons. For example, they provide a safe and convenient way to avoid carrying or handling cash and loose change. Also, they have found good use as gifts. Furthermore, if the card holder desires cash, many transaction cards allow access to funds through an automated teller machine (ATM). Moreover, some cards are re-loadable, meaning that the consumer can add funds to the associated account, which provides an extra measure of convenience.

Stored value card systems can be operated both as "closed" or "open" systems. Closed systems are limited to specific participating merchants (e.g., a particular store or chain of stores), or at various point of sale locations in a setting such as a college campus. Such cards would not be compatible with point of sale terminals outside the closed system. One example of a closed card is a pre-paid gift card that may only be purchased at, and only be used at, a clothing retailer, such as The Gape store. Open systems allow use of the card at any merchant having a compatible point of sale card reader or device, and therefore open cards are financial transaction cards that are generally accepted at different merchants.

The International Standards Organization (ISO) has established a number of specifications for such electronic cards under the ISO/IEC Standards Series 7810, 7811, 7816, and 10536. Typical smart cards include a plurality of electrical contracts on one surface which provide input and output interfaces with a microprocessor in the card. The cards can be "contact" cards, meaning that their contacts interface with a terminal via ohmic contact, or "contactless" cards, meaning that they rely on close-coupling with a terminal, employing radio frequency (RFID) communication between card and reader without physical insertion of the card. Some smart cards now include both types of contact schemes, in that they are compatible with terminals having either contact interfaces or contactless interfaces.

The microprocessor in a smart card is able to store an operating program and other information in volatile memory alterable by a Central Processing Unit (CPU), which possesses hard-wired control circuitry. A single Integrated Circuit (IC) chip can contain the CPU and the various types of memory, including volatile and non-volatile memory, which make up the microprocessor.

Smart card readers read the data stored on the smart chard chips. They can be plugged into computers, or can be built directly into computers, keyboards, cell phones, or other electronic devices. Software communicates with the reader and sends commands to manage the reader such as power up and transfer commands. Further, smart cards employ various forms of security for safety and protection.

Conventional stored value card systems are limited to providing cash equivalent value in accordance with the pre-paid amount of currency value stored in the smart card memory in advance, for use in a "closed" or "open" system, as described above. However, there is a need for providing to a user or receiver of the card benefits from certain merchants in a financial network beyond what is purchased with the card. There is also a need for providing to a user or receiver of the card a selection of benefits from which he or she would like to choose. There is also a need for a stored value card, usable within a financial network, that is directed to a specific theme or themes to which benefits are related, the benefits being provided by at least some of the merchants in the network.

BRIEF DESCRIPTION OF THE INVENTION

The present invention meets the above-identified needs by providing a system, method, and computer program product for providing a stored value card that affords a user or receiver of the card benefits from at least some of the merchants in a financial network beyond what is purchased with the card. Another advantage of the present invention is that it also provides a stored value card such as a gift card or pre-paid card, usable within a financial network, that is directed to a specific theme or themes to which the benefits are related, the benefits being provided by at least some of the merchants in the network. The stored value card could also not have a theme but offer a variety of benefits across different categories.

In accordance with one embodiment of the present invention, there is provided a system, computer product and method for a card issuer providing a stored value card to a purchaser, the stored value card usable by a recipient of the card to pay merchants who participate in a financial network. The method includes receiving a payment of a predetermined amount from the purchaser, and associating a value with the card, the value being at least as great as the predetermined amount received from the purchaser. The method further includes activating the stored value card, the activated stored value card being usable by the recipient for paying any of the merchants in the financial network, and being usable by the recipient to obtain a benefit beyond what is purchased from at least some of the merchants in the financial network.

The stored value card may be associated with a specific theme and may include a surface displaying an indication of that theme, and wherein the benefit is related to the theme. The theme may be, for example, a wedding, movies, dining out, kids, teens, birthdays, etc. The stored value card could also not have a theme but offer a variety of benefits across different categories. Further, the activating step may further comprise associating an identifier with the card, the identifier being usable by the recipient to obtain the benefit.

The method may further comprise maintaining a web site, and on the website, providing a list of participating merchants offering one or more benefits beyond what is purchased with the card, and providing a list of the benefits being offered by each participating merchant. The method may further include providing a participating merchant with access to the website for updating the list of benefits provided by the participating merchant.

In accordance with another embodiment of the present invention, there is provided a system for maintaining a financial network. A database can store information about participating merchants, card holders, and individual transactions involving card holders' accounts, each card holder holding a card usable for paying any of the participating merchants and for obtaining a benefit beyond what is purchased from at least some of the merchants in the financial network once the card is loaded with a payment of a predetermined amount and activated, until the predetermined amount is exhausted. A processor processes the individual transactions using the information stored in the database.

The database may include data identifying at least one card and merchants related to the card, wherein the card is associated with a specific theme and includes a surface displaying an indication of that theme, and wherein the benefit is related to the theme. The theme may be a wedding, movies, dining out, kids, teens, birthdays, etc. The system may further include a web site providing a list of participating merchants offering one or more benefits beyond what is purchased with the card, and providing a list of benefits being offered by each participating merchant. The system may further include providing a participating merchant with access to the website for updating the list of benefits provided by the participating merchant.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

Figure 1A:
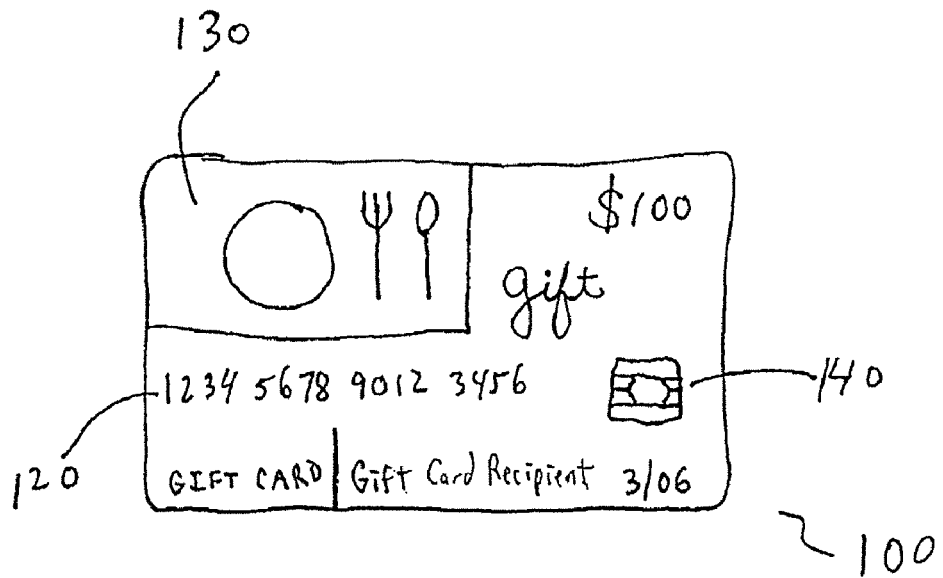
FIGS. 1A and 1B illustrate the front and back, respectively, of a financial transaction instrument according to one embodiment of the present invention.

The present invention is directed to a system, method and computer program product for providing a stored value card, usable within a financial network, that affords a user or receiver of the card benefits beyond what is purchased with the card, the benefits being related to a particular theme and provided by at least some of the merchants in a financial network. The benefits include, but are of course not limited to, discounts, gifts, special offers, special services, free goods or services, store credits, benefits under a merchant's loyalty program, or cash equivalent value.

The present invention is now described in terms of an exemplary system in which the present invention, in an embodiment, would be implemented. This is for convenience only and is not intended to limit the application of the present invention. It will be apparent to one skilled in the relevant art(s) how to implement the present invention in alternative embodiments.

The present invention is for use with financial transaction instruments including traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid, gift, or stored value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

With regard to use of a transaction account, users may communicate with card issuers or merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

"Merchant" includes any individual, business, entity, customer, hardware and/or software that receives a card number to facilitate a transaction, whether or not in exchange for goods or services. For example, a merchant may be an online bookstore, or a local restaurant.

In general, transaction accounts may be used for transactions between the user and merchant through any suitable communication device, such as, for example, a telephone network, an intranet, the global public Internet, a point of interaction device (e.g., a point of sale (POS) device, personal digital assistant (PDA), mobile telephone, kiosk, etc.), online communications, off-line communications, wireless communications, and/or the like.

An "account," "account number," or "account code", as used herein, may include any device, code, number, letter, symbol, digital certificate, smart chip, digital signal, analog signal, biometric or other identifier/indicia suitably configured to allow a consumer to access, interact with, or communicate with a financial transaction system. The account number may optionally be located on or associated with any financial transaction instrument (e.g., a charge, credit, debit, prepaid, telephone, smart, magnetic stripe, bar code, transponder or radio frequency card). The account number may be distributed and stored in any form of plastic, electronic, magnetic, radio frequency (RF), wireless, audio and/or optical device capable of transmitting or downloading data from itself to a second device.

Figure 1B:
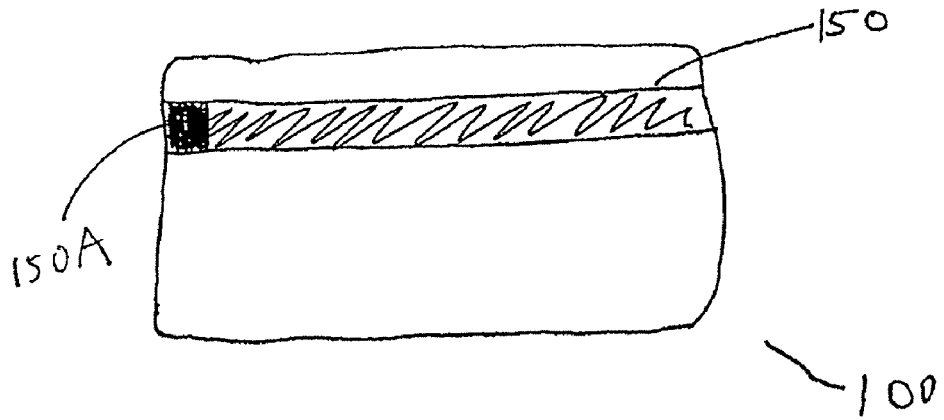

FIGS. 1A and 1B illustrate the front and back, respectively, of a financial transaction instrument according to one embodiment of the present invention. The instrument in this example is a smart card 100, which, as illustrated in FIG. 1A, includes an account number 120, a theme design surface 130, and a smart card chip 140. The smart card chip 140 includes a microprocessor, a card reader interface, a RAM, a ROM, a non-volatile memory, and a cryptographic module (none of which are shown, but all of which are known in the art). FIG. 1B, which illustrates the back of the smart card 100, shows a magnetic strip 150 which contains information for performing multiple functions. Within the magnetic strip information is an area 150A that contains a flag to inform a merchant's terminal that the card is in their program.

Figure 2:
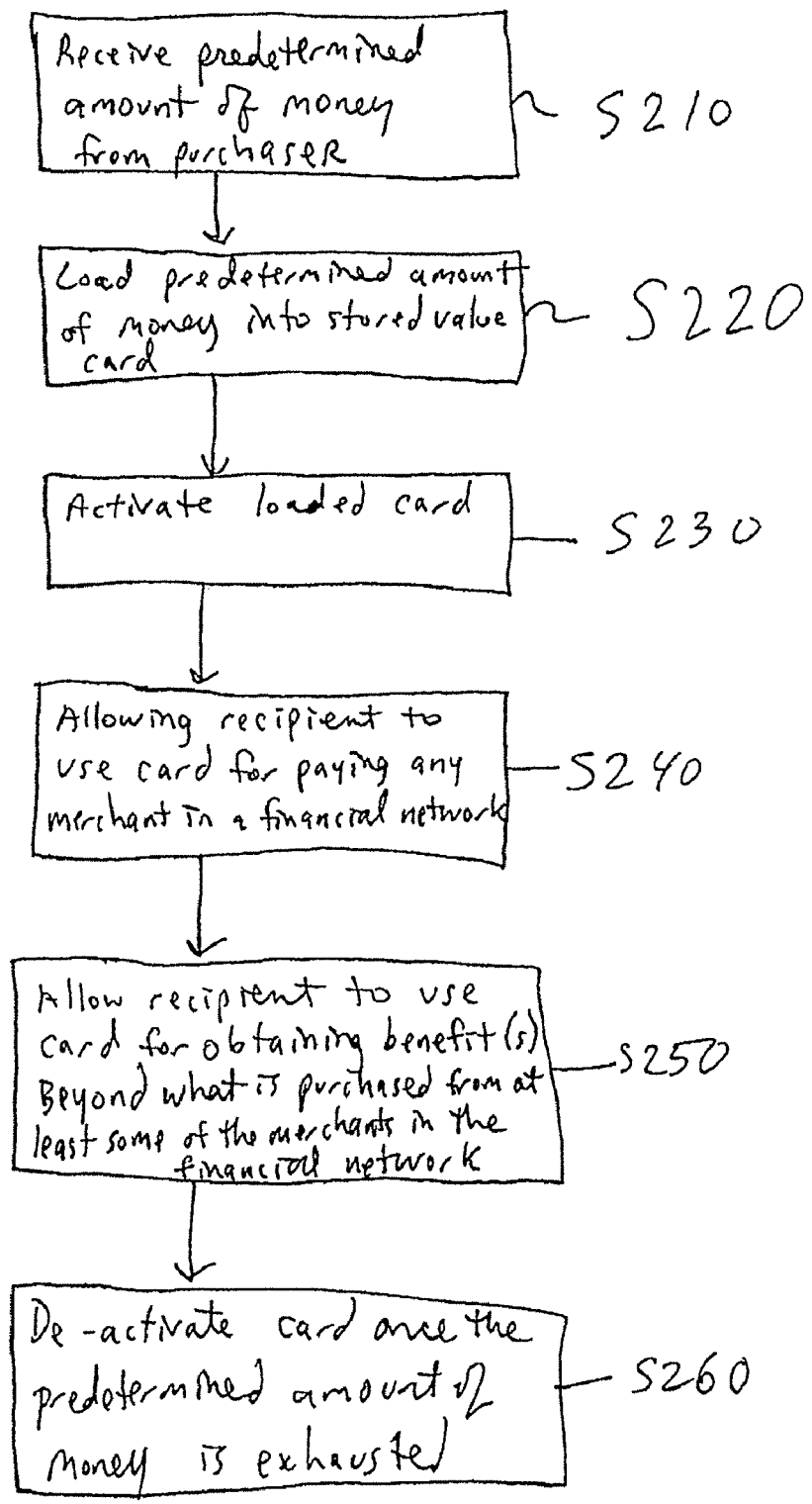
FIG. 2 is a flowchart illustrating a method according to one embodiment of the present invention.

FIG. 2 is a flowchart illustrating a method according to one embodiment of the present invention. The method is for providing a stored value card or prepaid gift card to a purchaser, the gift card being usable by a recipient thereof to pay merchants who are in a financial network.

In step S210, a card provider receives a predetermined amount of money from a purchaser wishing to purchase a prepaid gift card. Gift cards as envisioned herein may be provided to correspond with any amount of predetermined money, for example, denominations of $50, $100, $500, or any other amount.

In step S220, the card provider loads the predetermined amount of money into the stored value card such that the card is equipped with cash equivalent value corresponding to the predetermined amount. The card is activated in step S230, which may include associating an identifier with the card, the identifier being usable by the recipient to obtain a benefit.

At this point, in step S240, the card provider enables the recipient to use the card for paying any merchant in the financial network. The recipient is also enabled, in step S250, to use the card for obtaining a benefit or benefits beyond what is purchased, from at least a subset of the merchants in the financial network. The card may be associated with a specific theme, for example, movies or weddings, with which the subset of merchants is also associated. The card 100 in FIG. 1A, for example, conveys a dining theme to a recipient in a festive manner on a surface 130 displaying an indication of that theme.

In this way, while the card of the present invention can be used to pay any merchant in the financial network, the participating merchants (those associated with the theme) are also afforded the opportunity to offer benefits to the recipient beyond what is purchased with the card. The merchants can use the availability of these additional benefits to attract customers to their business, and the invention provides the recipient with options beyond those provided by typical gift cards, as conventional gift cards are limited to specific merchants in a specific system all providing the same feature: cash equivalent value on the gift card commensurate with the amount of monetary value added onto the card. On the other hand, the present invention provides a multi-tiered system as shown in FIG. 3.

Figure 3:
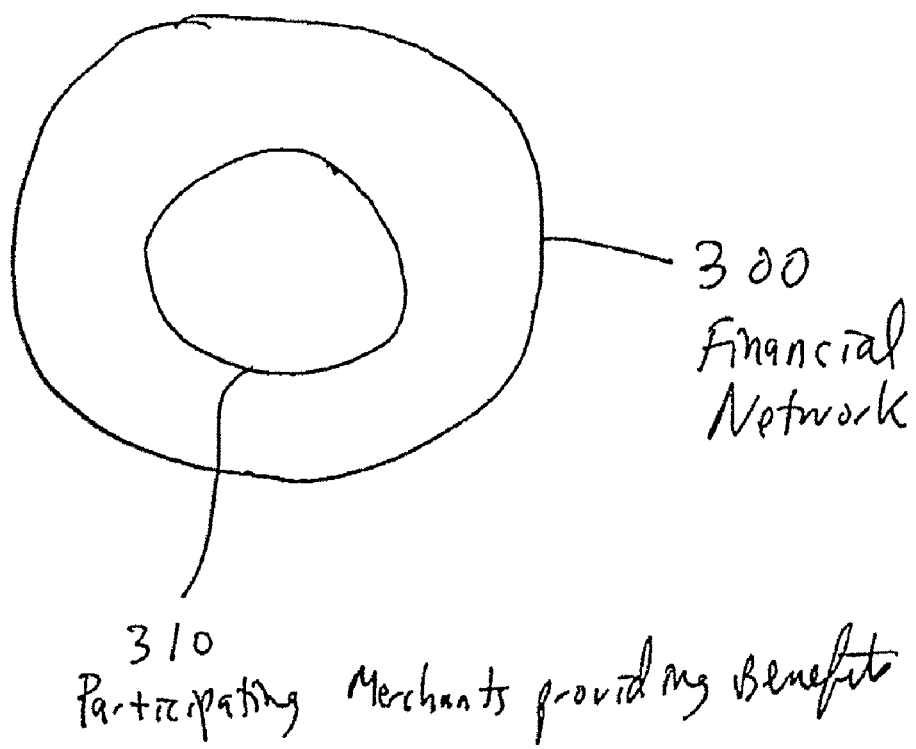
FIG. 3 is a diagram of a universe of a financial network which includes a subset of merchants providing benefits corresponding to a theme according to one embodiment of the present invention.

In FIG. 3, the universe of the entire financial network in which the recipient can use the card of the present invention to make purchases anywhere therein is shown by the outer circle, or reference numeral 300. However, within that financial network 300, a subset 310 of merchants, e.g. those associated with a particular theme (for example, a movie theme), can provide the recipient with benefits beyond what is purchased with the card. Alternatively, the subset 310 of merchants may include only some of the merchants in the financial network who are associated with the theme.

For example, in the dining gift card example shown in FIG. 1A, a card recipient may enjoy an evening out at a restaurant of their choice. Because the card is good for purchases anywhere within the financial network, recipients can choose where they want to dine, whether it be a favorite restaurant in their neighborhood or a new place they wish to try. Then, the dining gift card comes with added benefits, in that the recipient is provided, by participating restaurants with a selection of special offers to choose from. For example, a participating restaurant may provide a choice of a free dessert, a free after-dinner drink, or the like when the dining card is used at their restaurant. The dining gift card may be available in any denomination and may be purchased online and at participating retailers, banks, malls, and other merchants.

As another example, the gift card could be a movie gift card. In this example, the movie gift card can be used to pay any merchant in the financial network, and participating theaters or video stores can offer benefits to recipients who patronize their theater or rent a video from their store. Such benefits may include, for example, free movie tickets, free movie rentals, "buy one get one free" popcorn, etc. The movie gift card, which can have a festive movie theme printed thereon, may be available in any denomination and may be purchased online and at participating theaters, retailers, banks, malls, and other merchants.

As another example, the card could be a wedding gift card. In this example, the wedding gift card can be given to a happy couple as a wedding gift in order to provide the couple with purchasing options anywhere in the financial network. Further, participating merchants associated with the wedding theme can offer benefits to the recipients who use the card at their store. Such benefits may include, for example, free prints from an online digital photo developing service, or discounts at national retailers. The wedding gift card, which can have a festive wedding theme printed thereon, may be available in any denomination and may be purchased online and at participating theaters, retailers, banks, malls, and other merchants.

It is of course to be understood that the dining, movie, wedding, kids, teens, and birthday themes are examples, and that the invention is not limited in any way to these examples. Other examples and themes are readily envisioned. Accordingly, a card in accordance with the invention can be used not only at restaurants and movie theaters and the like, but also at a variety of other retailers and types of retailers, and in connection with a variety of themes.

Figure 4:
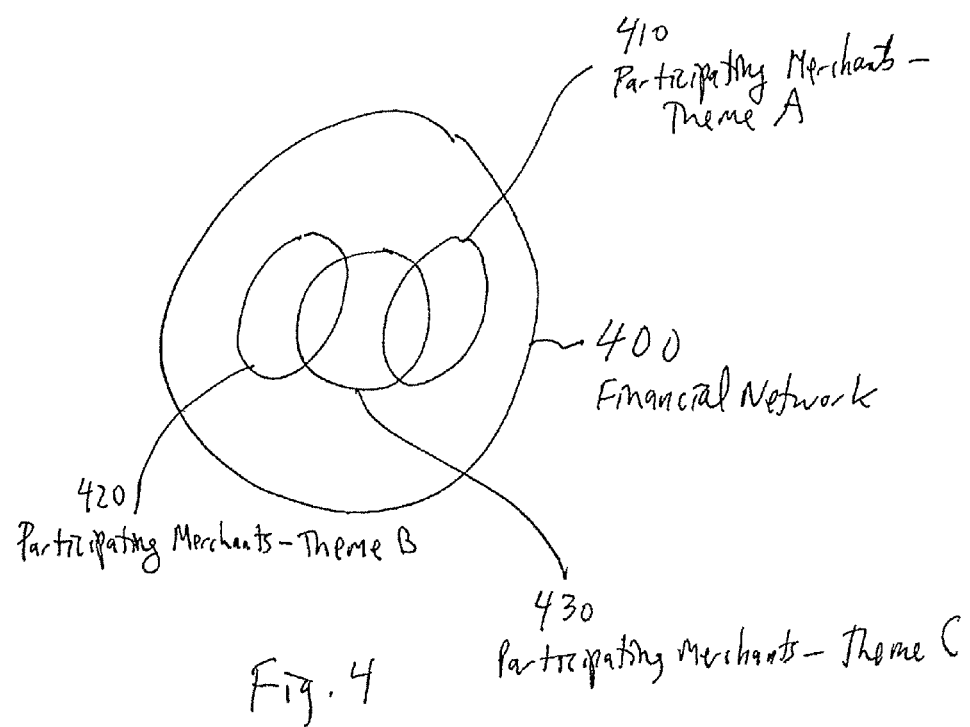
FIG. 4 is a diagram of a universe of a financial network which includes multiple subsets of merchants providing benefits corresponding to multiple themes according to another embodiment of the present invention.

It is further noted that the invention as illustrated in FIG. 3 is not limited to including just one subset of merchants associated with one theme, as shown in that figure. Rather, the financial network 300 may include multiple subsets of merchants associated with multiple themes (and some of the merchants may belong to more than one subset). For example, FIG. 4 shows a universe of a financial network 400 which includes multiple (three in this example) subsets of merchants 410, 420, and 430, corresponding to three different themes A, B, and C (for example, a movie theme, a dining theme, and a wedding theme). This provides the recipient with benefits beyond what is purchased with the card, and from merchants from multiple subsets. In this way, a card in accordance with the present invention can be multi-themed, for example can have a movie theme and a dining theme, and the recipient can be afforded benefits from merchants within each theme. It is noted that merchants may belong to more than one subset.

An advantage of the present invention is that it provides the ability to purchase and receive prepaid or gift cards which not only are usable within the particular financial network, but are also related to specific themes such that the recipient can enjoy benefits related to something he or she likes from a subset of merchants relating to that theme. If the recipient is a movie lover, he or she can enjoy movie-related benefits. If the recipients enjoy dining out, they can enjoy dining- or restaurant-related benefits. If the recipients are getting married, they can enjoy benefits beyond what they simply purchase with the card. Such benefits may be uploaded on the card and may accrue in any number of ways, for example based on the monetary value of the card, or on the classification (e.g. "gold status") of the card, or from a merchant providing such benefits to all card holders.

Another advantage of the present invention is that it provides the card recipient with a selection of benefits from which to choose, and a simple way to view and choose from the selection. In so doing, the recipient can access a website and view a list of benefits being offered by the merchants within the particular theme(s). The recipient can also choose from the list and access further information about the benefits and options available. The recipient may also see a list of benefits available in different locations, for example if he or she is traveling to Miami and wants to see a list of benefits provided by merchants in that city. The card provider can maintain the website, interact with recipients, and upload benefits information provided to them from the merchants. Information on benefits which, of course, can change on a regular basis, may be made available to recipients over the telephone or other suitable means as well.

In this way, the card issuer can maintain a website listing at least some of the merchants in a financial network offering benefits beyond what is purchased with the card, and listing what those benefits or extras are. And the card issuer can establish and offer the predetermined benefit or benefits. Further, access to the website may be provided to the merchants in order to permit them to update their list of benefits themselves. Also, the website can be accessed by members of the general public who do not have a card, in order to view information relating to the card, which may include a list of benefits being provided and a list of merchants providing them.

Figure 5:
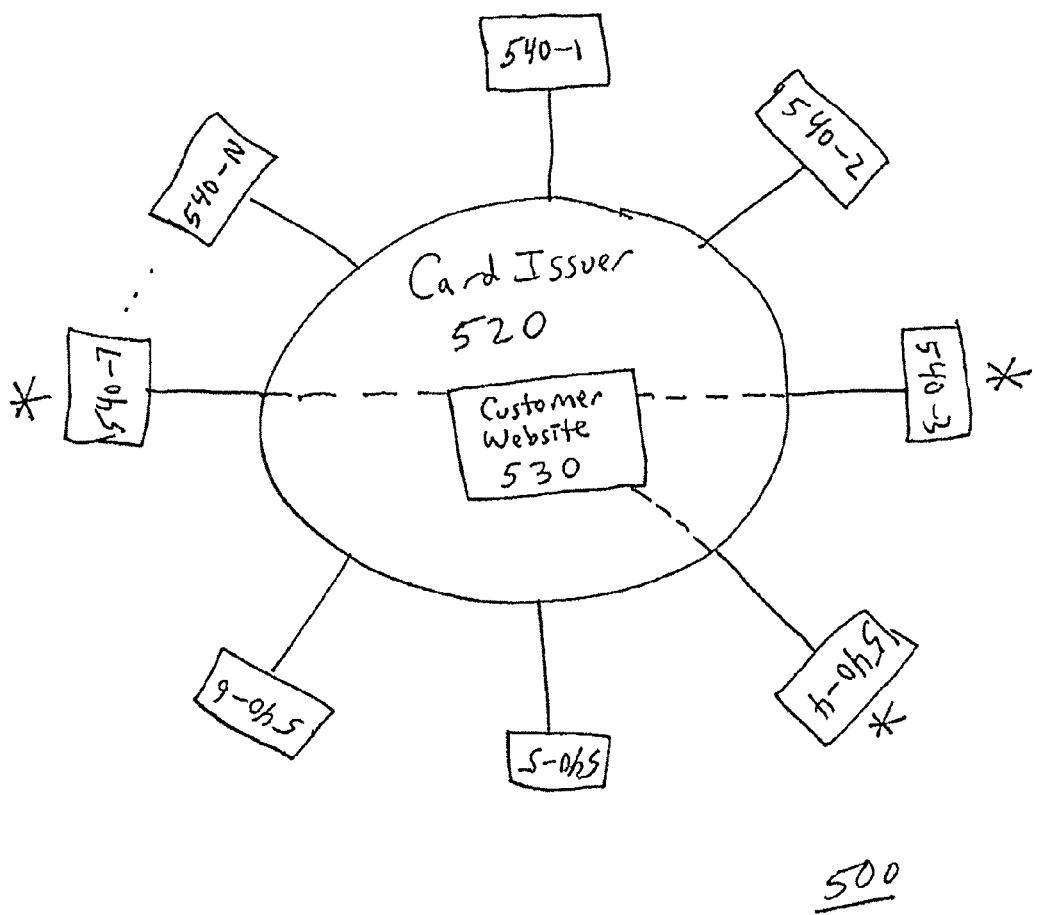
FIG. 5 illustrates a system in accordance with one embodiment of the present invention.

FIG. 5 illustrates a system 500 in accordance with one embodiment of the present invention. The system 500 shows a plurality of merchants 540-1 to 540-N, who accept payment by means of the issuers' cards, each connected to the card issuer 520 via a network. Those merchants that participate in providing recipients with benefits beyond what is purchased with the card are shown with asterisks in FIG. 5. Specifically, in FIG. 5, merchants 540-3, 540-4, and 540-7 are shown as such participants. The card issuer 520 runs a customer website 530, which provides card holders with the ability to log in using an account code and view a list of available benefits. Participating merchants may also log in to the customer website using an access code in order to update or revise the list of benefits that they provide.

Figure 6:
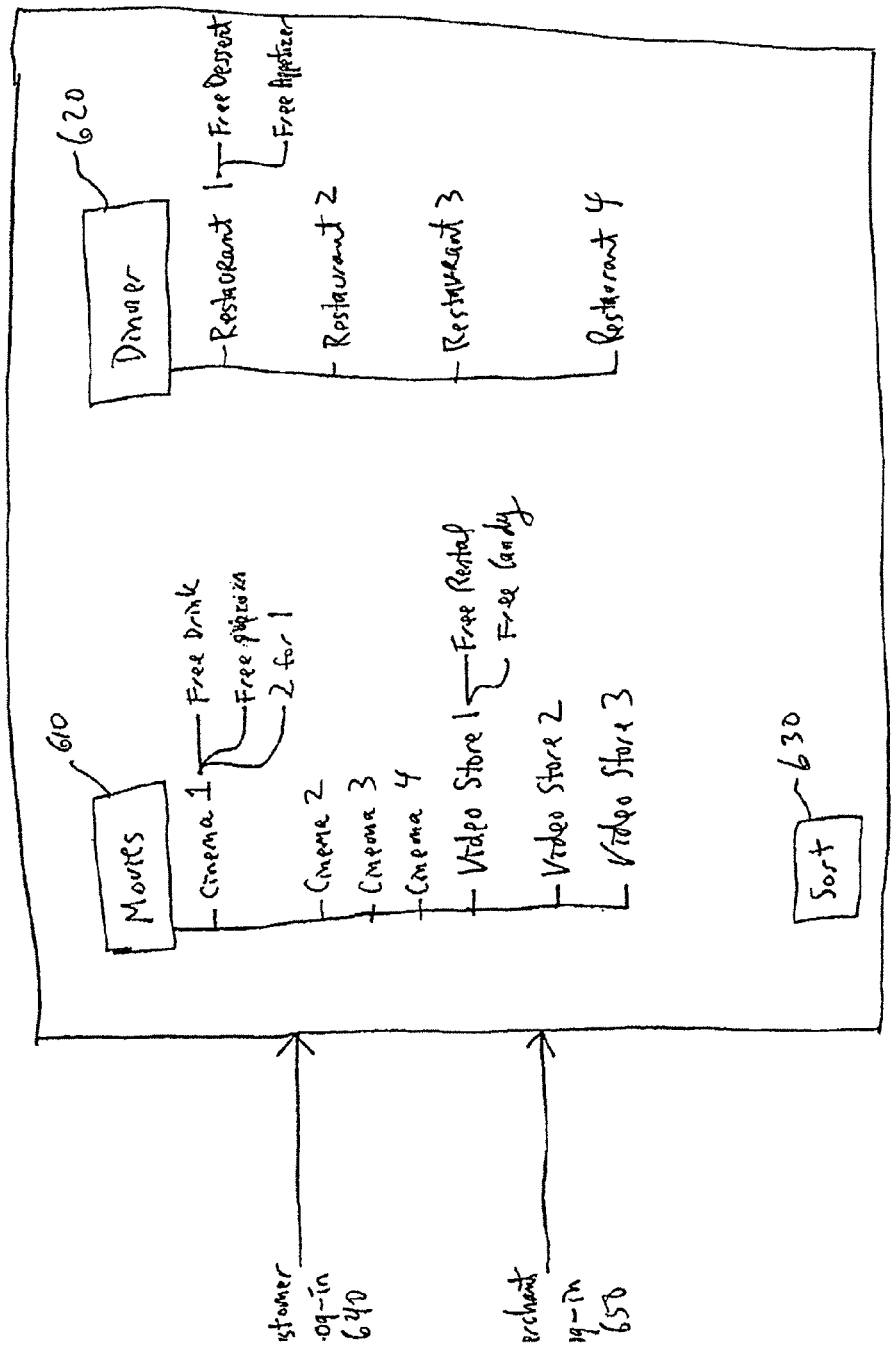
FIG. 6 illustrates one example of a customer website in accordance with the present invention.

FIG. 6 illustrates one example of customer website 530 in accordance with the present invention. Customers can log in through access point 640 to view the theme(s) to which the card is directed and a list of benefits being offered by the various participating merchants in exchange for use of the card. In this example, the card offers benefits directed to movies and dinner. Clicking on the Movies hyperlink 610 would pull up a list of the participating merchants for this theme, and further clicking on a particular merchant would provide the list of benefits offered by that merchant (of course, any lists could be shown all on the same screen, or in various forms and formats). For example, by clicking on Cinema 1, the customer can see that this cinema is offering a choice among a free drink, one free popcorn, and a two-for-one. By clicking on Video Store 1, the customer sees that this video store is offering either of a free rental and one free candy item.

Clicking on the Dinner hyperlink 620 would pull up a list of participating restaurants, and further clicking on a particular restaurant would provide a list of benefits offered by that restaurant. For example, by clicking on Restaurant 1, the customer can see that this restaurant is offering either of a free dessert and a free appetizer. The Sort hyperlink 630 may provide various options for sorting the information, including sorting by location, by store or chain of stores, etc.

Figure 8:
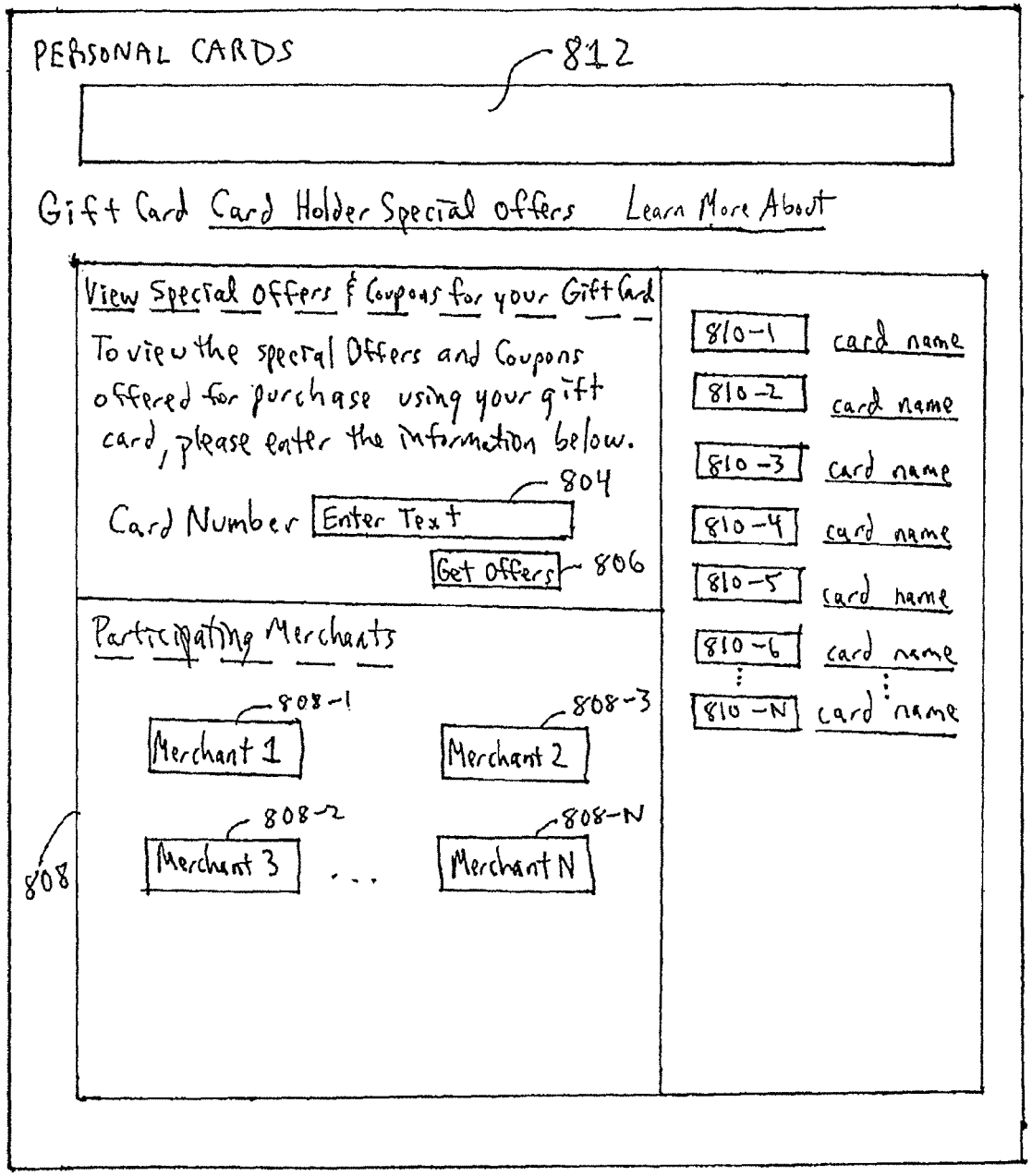
FIGS. 8 and 9 illustrate another example of a customer website in accordance with the present invention.
Figure 9:
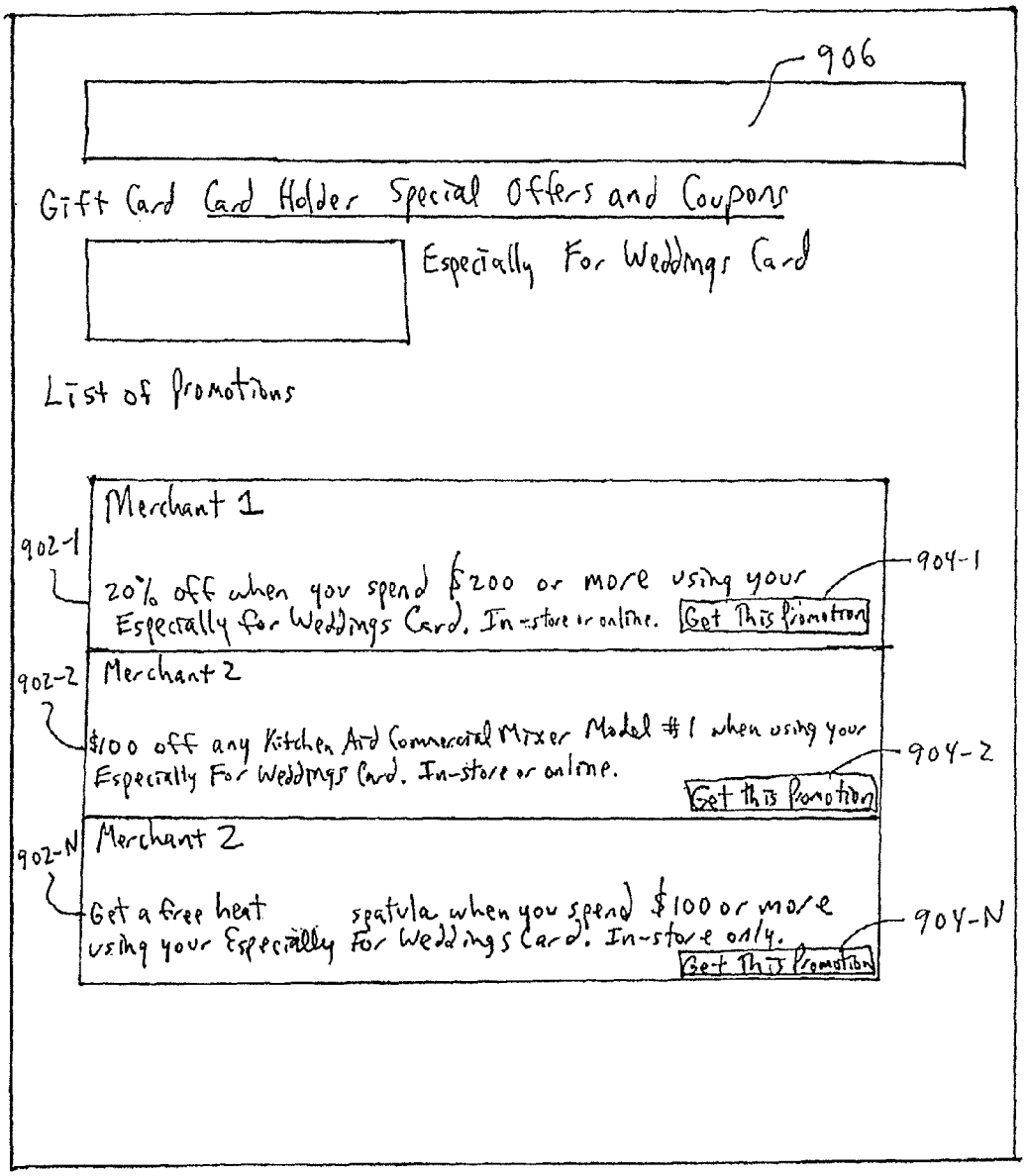

FIGS. 8 and 9 illustrate another example of customer website 530 in accordance with the present invention. FIG. 8 shows an Offer Landing page 800 which enables customers to view benefits (special offers, coupons, etc.) associated with their card or with other cards. FIG. 9 shows an Offer Redemption page 900 in which card holders can redeem benefits from their card. In this example, the card offers benefits directed to weddings, i.e., a Wedding Gift Card.

In this example, customers are driven to the Offer Landing page 800 via a drive to web marketing messaging, and are provided with a list of participating merchants 808. Card holders can log on to the Offer Redemption page (FIG. 9) to enable them to view a list of benefits being offered by the various participating merchants of the theme(s) associated with the card, in exchange for use of the card. In this example, entering the Gift Card number into box 804 and then clicking on the Get Offers access point 806 would pull up the Offer Redemption page 900 (FIG. 9), once the system verifies that the card number entered is associated with the Wedding Gift Card. The Offer Redemption page 900 provides the card holder with a description of the offers available 902-1 to 902-N for that card from the various participating merchants. Further clicking on a Get This Promotion hypertext link 904-1 to 904-N would provide either a downloadable coupon associated with that offer for the customer to print when redeeming in store, or a promotion code for the customer to enter when redeeming online.

Thus, in this example, the customer can see a description of the Wedding Gift Card offers available at Merchant 1 (e.g., a home goods store) and two offers available at Merchant 2. The customer can see that Merchant 1 is offering 20% off when spending $200 or more using the Wedding Gift Card. By clicking on the Get This Promotion hypertext link 904-1, another browser will open up with a printable coupon that the customer can bring in for store redemption. The printable coupon may be in any suitable file format, e.g., a .pdf.

It is noted that boxes 812 (FIG. 8) and 906 (FIG. 9) can provide an area for graphics or textual messages or advertisements. Further, customers, even if they do not hold a particular card, can also see a list of cards available 810-1 to 810-N. 808-1 to 808-N displays a list of participating merchants and could possibly highlight the benefits that these merchants will offer.

Figure 10:
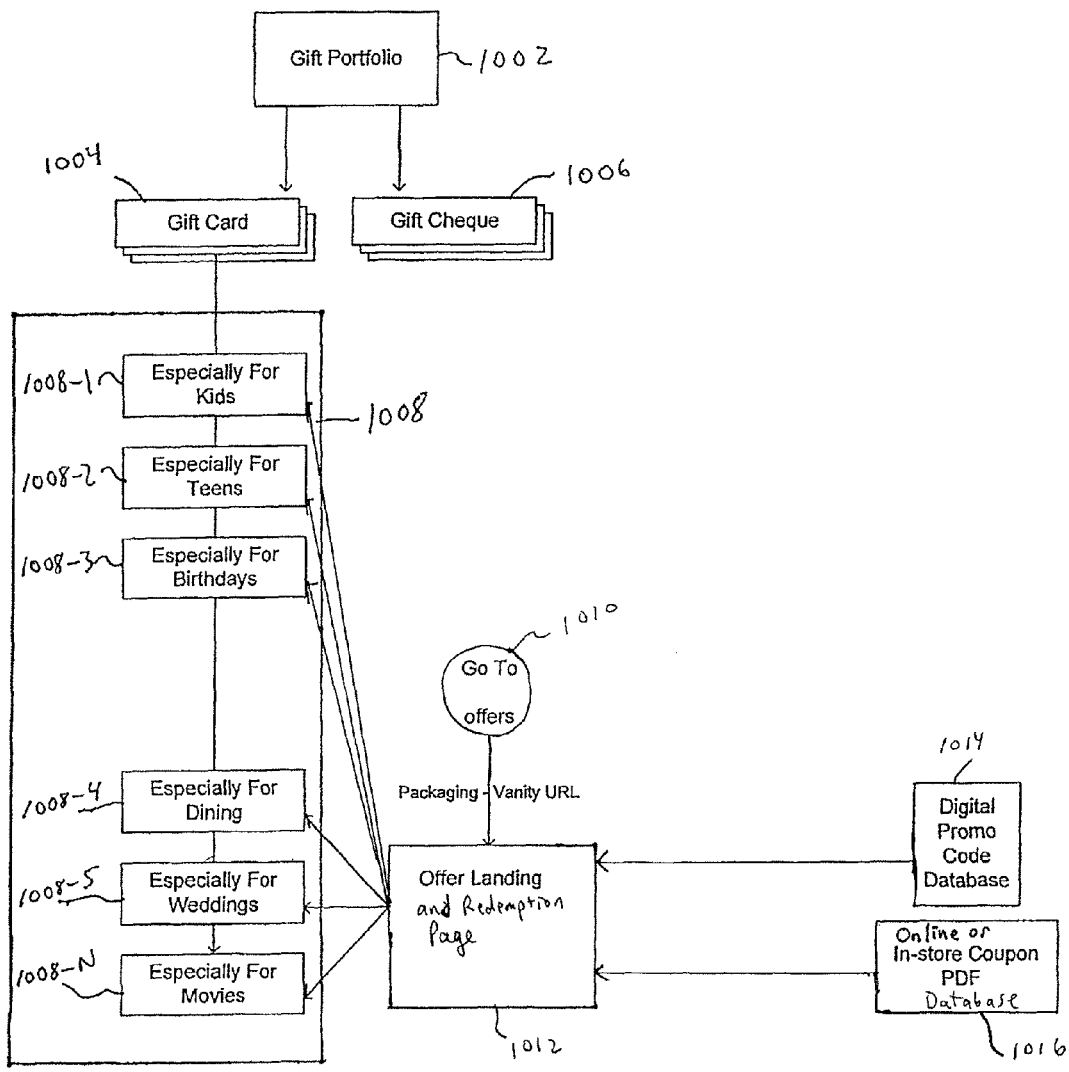
FIG. 10 is a diagram showing an example implementation of the present invention.

FIG. 10 is a diagram showing an example implementation of the present invention. The system provider offers a gift portfolio 1002, which, in this example, includes gift cards 1004 and gift checks 1006. The gift cards 1008-1 to 1008-N may be modeled after any number of themes. For example, the card provider can offer a gift card especially for kids 1008-1, a gift card especially for teens 1008-2, a gift card especially for birthdays 1008-3, a gift card especially for dining 1008-4, a gift card especially for weddings 1008-5, a gift card especially for movies 1008-N, etc. (Of course, these examples are in no way meant to be limiting, and the card provider can offer a gift card designed to any other theme.)

A customer or potential customer is driven to an Offer Landing and Redemption Page 1012 by way of web portal 1010. From there, the customer can see a list of the gift cards offered 1008-1 to 1008-N, as well as the various benefits, themes, and participating merchants associated with each. Customers can also view a list of benefits being offered by the various participating merchants of the theme(s) associated with the card, in exchange for use of the card. For example, the customer can view the benefits provided by the dining gift card 1008-4, the weddings gift card 1008-5, and the movies gift card 1008-N, etc. (Of course, as will be understood by those having ordinary skill in the art, this information may be provided in ways other than website form as well.) From Offer Landing and Redemption Page 1012, the customer can print (e.g. in .pdf form) a promotion code, or coupons displaying the offer, for example by entering the gift card number. A digital promo code database 1014 and an online or in-store coupon database 1016 can enable the system to provide a unique promotion code or coupon to each customer.

Of course, the present invention is not limited to the examples presented herein, and various modifications thereof are readily envisioned. Special offers can be available for all products within the gift portfolio 1002, and are of course not limited to the examples presented.

The Offer Landing and Redemption Page 1012 is shown as one page in FIG. 10, but in alternative embodiment can be broken into more than one page, e.g., an Offer Landing Page and an Offer Redemption Page. In this embodiment, customers may first be driven to the Offer Landing Page by way of web portal 1010, and from there, the customer may see a list of the gift cards offered 1008-1 to 1008-N, as well as the various benefits, themes, offers, and participating merchants associated with each. Customers may also view the Offer Redemption Page which enables them to view a list of benefits being offered by the various participating merchants of the theme(s) associated with the card, in exchange for use of the card. For example, the customer can view the benefits provided by the dining gift card 1008-4, the weddings gift card 1008-5, or the movies gift card 1008-N, by accessing a webpage or webpages from the Offer Redemption Page, which is linked to the digital promotion code database 1014 and the online or in-store coupon database 1016. The customer can also print from that page (e.g. in .pdf form) a promotion code, or coupons displaying the offer.

Further, as noted the gift portfolio 1002 includes gift cards 1004 and gift cheques 1006. A gift cheque 1006 may comprise, for example, a paper instrument which is associated with a value of money and can be tendered by its recipient in lieu of the same amount of cash to pay merchants who participate in a financial network. (The gift cheque 1006 need not be of paper, but can be made of other similar materials.) In accordance with this invention, the gift cheque 1006 is further usable by its recipient to obtain a benefit beyond what is purchased, from at least some of the merchants in the financial network. The gift cheque 1006 may, in one embodiment, be associated with a specific theme and may include a surface displaying an indication of that theme, the benefit being related to the theme. Information pertaining to gift cheque recipients may be stored in a database similarly to what is described herein in relation to information on recipients of gift cards.

It is noted that benefits in accordance with gift cards of the present invention may be fulfilled in accordance with a process which automates fulfillment for both the merchants and the card recipients. That is, benefits can be fulfilled automatically on the swipe of the gift card. For example, if a card recipient goes to the movie theater and uses their movie gift card to purchase a movie ticket, the recipient can automatically receive a free bucket of popcorn.

Figure 7:
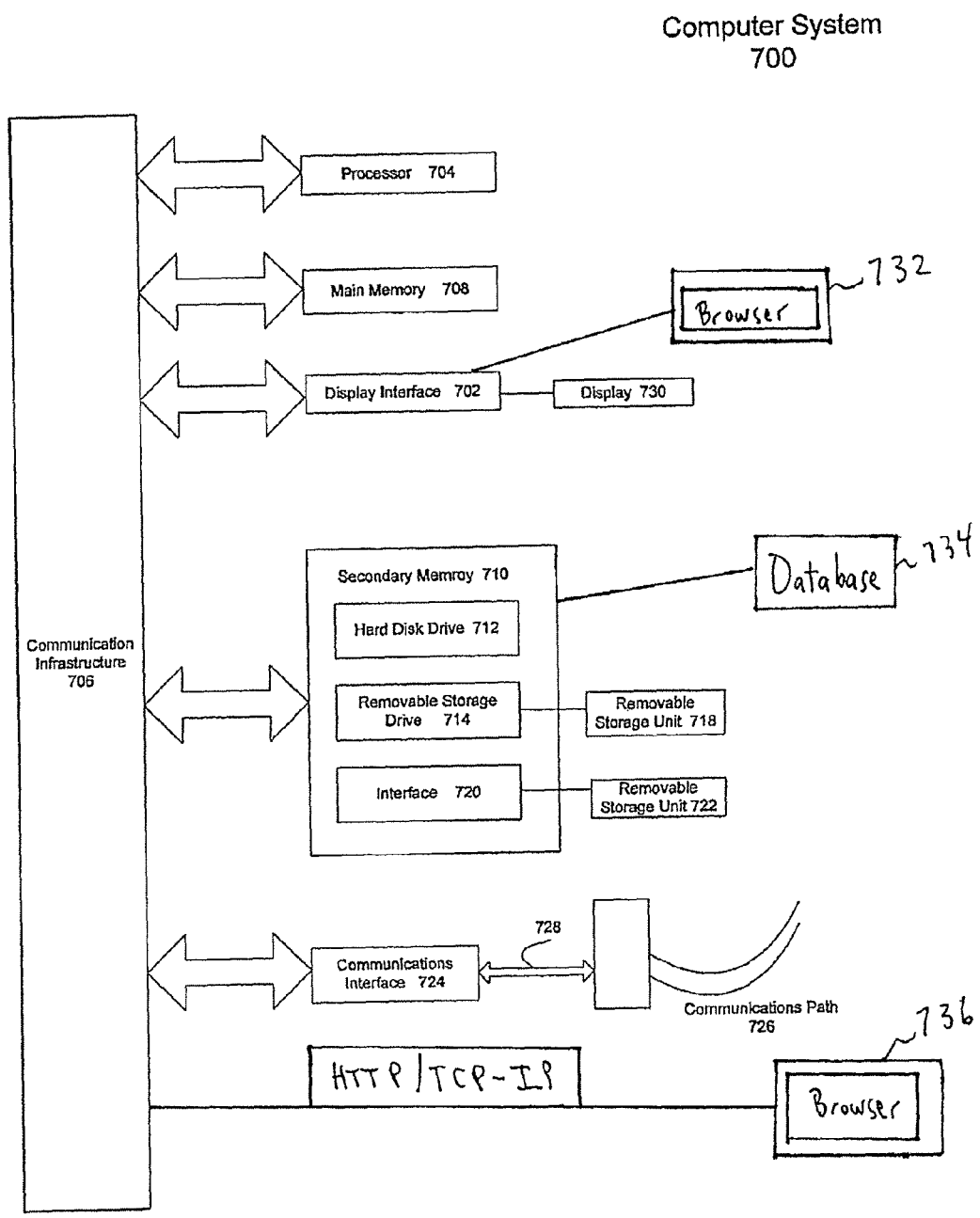
FIG. 7 illustrates an example of a computer system.

The present invention or any part(s) or function(s) thereof may be implemented using hardware, software or a combination thereof and may be implemented in one or more computer systems or other processing systems. Useful machines for performing the operations of the present invention include general purpose digital computers or similar devices. In fact, in one embodiment, the invention is directed toward one or more computer systems capable of carrying out the functionality described herein. An example of a computer system 700 is shown in FIG. 7.

The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730. Display interface 702 can communicate with browser 732. Computer system 700 also includes a main memory 708, preferably random access memory (RAM), and may also include a secondary memory 710 and a database 734. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data. For example, the secondary memory 710 can store a database storing information of participating merchants and card holders, and individual transactions involving card holders' accounts. Processor 704 can process the individual transactions using the information stored in the database, and the database can include data identifying at least one theme and merchants related to the theme, and data relating to benefits being offered by each merchant participating in a theme beyond what is purchased with the card.

In alternative embodiments, secondary memory 710 may include other similar devices for allowing computer programs or other instructions to be loaded into computer system 700.

Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels. Browser 736 is connected to communication infrastructure 706.

In this document, the terms "computer program medium" and "computer usable medium" are used to refer generally to media such as removable storage drive 714, a hard disk installed in hard disk drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface N24. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the Figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
    issuing, by a computer based system for maintaining a financial network, a stored value transaction account, wherein new stored value transaction account offers are provided via a website, wherein the stored value transaction account is associated with a theme of a plurality of themes, wherein a particular stored value transaction account is selected by a purchaser based in part on a particular offer;
    receiving, by the computer based system, purchase transaction data including data representing the merchant, wherein the purchase transaction data is a result of using the stored value transaction account in a transaction with the merchant, wherein the stored value transaction account is usable in transactions with any merchant in the financial network;
    determining, by the computer based system, that the merchant is part of the subset of the merchants within the financial network;
    obtaining, by the computer based system and in response to the determination that the merchant is part of the subset of the merchants, benefit data associated with the merchant, wherein at least one of the merchant or the subset of merchants within the financial network provide a benefit, wherein benefit data represents the benefit that is beyond what is purchased by the stored value transaction account, wherein the benefit data associated with use of the stored value transaction account is provided via the website, wherein the merchant is part of a subset of merchants associated with the theme, and wherein the merchant provides benefit data to the website; and
    associating, by the computer based system, the benefit with the stored value transaction account.

2. The method of claim 1, wherein the stored value transaction account includes a transaction instrument associated with the stored value transaction account including a surface displaying an indication of the associated theme, and wherein the benefit data is related to the theme.

3. The method of claim 2, wherein the theme is at least one of a wedding, movies, dining out, kids, teens, or birthdays.

4. The method of claim 1, further comprising:
    receiving, by the computer based system, discount data or promotion code data for use in connection with the benefit data.

5. The method of claim 1, wherein the issuing further comprises: associating, by the computer based system, an identifier with the stored value transaction account to obtain the benefit.

6. The method of claim 1, further comprising:
associating, by the computer based system, a value with the stored value transaction account, the value based on a monetary value amount received from the stored value transaction account purchaser.

7. The method of claim 1, wherein the benefit beyond what is purchased by the stored value transaction account comprises at least one of discounts, gifts, special offers, special services, free goods, free services, store credits, benefits under a merchants loyalty program, and monetary value.

8. The method of claim 1, wherein the benefit data is automatically obtained in response to using the stored value transaction account in the transaction with the merchant determined to be part of the subset of the merchants within the financial network.

9. A computer based system, comprising:
a computer network communicating with a memory;
the memory communicating with a processor; and
the processor, when executing a computer program for maintaining a financial network, is configured to:
issue, by the processor, a stored value transaction account, wherein new stored value transaction account offers are provided via a website, wherein the stored value transaction account is associated with a theme of a plurality of themes, and wherein a particular stored value transaction account is selected by a purchaser based in part on a particular offer;
receive, by the processor, purchase transaction data including data representing the merchant, wherein the purchase transaction data is a result of using the stored value transaction account in a transaction with the merchant, wherein the stored value transaction account is usable in transactions with any merchant in the financial network;
determine, by the processor, that the merchant is part of the subset of the merchants within the financial network;
obtain, by the processor, in response to the determination that the merchant is part of the subset of the merchants, benefit data associated with the merchant, wherein at least one of the merchant or the subset of merchants within the financial network provide the benefit, wherein benefit data represents the benefit that is beyond what is purchased by the stored value transaction account, wherein the benefit data associated with use of the stored value transaction account is provided via the website, wherein the merchant is part of a subset of merchants associated with the theme, and wherein the merchant provides benefit data to the website; and
associate, by the processor, the benefit with the stored value transaction account.

10. The computer based system of claim 9, wherein the stored value transaction account includes a transaction instrument associated with the stored value transaction account including a surface displaying an indication of the associated theme, and wherein the benefit data is related to the theme.

11. The computer based system of claim 9, wherein the theme is at least one of a wedding, movies, dining out, kids, teens, or birthdays.

12. The computer based system of claim 9, further comprising:

receiving, by the computer based system, discount data or promotion code data for use in connection with the benefit data.

13. The method computer based system of claim 9, wherein the benefit data is automatically obtained upon using the stored value transaction account in the transaction with the merchant determined to be part of the subset of the merchants within the financial network.

14. The computer based system of claim 9, further comprising:
associating, by the computer based system, a value with the stored value transaction account, wherein the value is based on a monetary value amount received from the stored value transaction account purchaser.

15. A tangible non-transitory computer-readable medium having stored thereon sequences of instruction, the sequences on instruction when executed by a computer based system for managing stored value transaction account use, causes the computer based system to perform the operations comprising:
issuing, by the computer based system, a stored value transaction account, wherein new stored value transaction account offers are provided via a website, wherein the stored value transaction account is associated with a theme of a plurality of themes, and wherein a particular stored value transaction account is selected by a purchaser based in part on a particular offer;
receiving, by the computer based system, purchase transaction data including data representing the merchant, wherein the purchase transaction data is a result of using the stored value transaction account in a transaction with the merchant, wherein the stored value transaction account is usable in transactions with any merchant in the financial network;
determining, by the computer based system, that the merchant is part of the subset of the merchants within the financial network;
obtaining, by the computer based system, in response to the determination that the merchant is part of the subset of the merchants, benefit data associated with the merchant, wherein at least one of the merchant or the subset of merchants within the financial network provide the benefit, wherein benefit data represents the benefit that is beyond what is purchased by the stored value transaction account, wherein the benefit data associated with use of the stored value transaction account is provided via the website, wherein the merchant is part of a subset of merchants associated with the theme, and wherein the merchant provides benefit data to the website; and
associating, by the computer based system, the benefit with the stored value transaction account.

16. The medium of claim 15, further comprising:
associating, by the computer based system, a value with the stored value transaction account, the value based on a monetary value amount received from the stored value transaction account purchaser.

17. The medium of claim 15, wherein the benefit data is automatically obtained in response to using the stored value transaction account in the transaction with the merchant determined to be part of the subset of the merchants within the financial network.

* * * * *

UNITED STATES PATENT AND TRADEMARK OFFICE
CERTIFICATE OF CORRECTION

PATENT NO. : 8,267,313 B2
APPLICATION NO. : 11/555060
DATED : September 18, 2012
INVENTOR(S) : Taryn C. Harper et al.

It is certified that error appears in the above-identified patent and that said Letters Patent is hereby corrected as shown below:

In Column 14 Line 4, delete "method".

Signed and Sealed this
Thirtieth Day of October, 2012

David J. Kappos
*Director of the United States Patent and Trademark Office*